(12) United States Patent
Cai et al.

(10) Patent No.: US 8,343,687 B2
(45) Date of Patent: Jan. 1, 2013

(54) RECHARGEABLE FUEL CELL SYSTEM

(75) Inventors: Jun Cai, Shanghai (CN); Chang Wei, Niskayuna, NY (US); Qunjian Huang, Shanghai (CN); Jinghua Liu, Shanghai (CN); Hai Yang, Shanghai (CN); Shengxian Wang, Shanghai (CN); Rihua Xiong, Shanghai (CN); Andrew Philip Shapiro, Schenectady, NY (US); Richard Louis Hart, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1114 days.

(21) Appl. No.: 11/641,171

(22) Filed: Dec. 19, 2006

(65) Prior Publication Data

US 2008/0145737 A1  Jun. 19, 2008

(51) Int. Cl.
 *H01M 8/08* (2006.01)
(52) U.S. Cl. ................................ 429/498; 429/499
(58) Field of Classification Search ............. 429/27
See application file for complete search history.

(56) References Cited

U.S. PATENT DOCUMENTS

| | | |
|---|---|---|
| 3,239,384 A | 3/1966 | Meyers |
| 3,468,713 A | 9/1969 | Mueller |
| 3,666,561 A | 5/1972 | Chiku |
| 4,015,052 A | 3/1977 | Cherón |
| 4,037,023 A | 7/1977 | Grehier et al. |
| 4,168,349 A | 9/1979 | Buzzelli |
| 4,176,213 A | 11/1979 | van Linden |
| 4,243,731 A | 1/1981 | Cherón |
| 4,276,355 A | 6/1981 | Kothmann et al. |
| 4,292,379 A | 9/1981 | Kothmann |
| 4,308,322 A | 12/1981 | Hammar |
| 4,324,844 A | 4/1982 | Kothmann |
| 4,342,816 A | 8/1982 | Kothmann et al. |
| 4,366,211 A | 12/1982 | Pollack |
| 4,383,009 A | 5/1983 | Kothmann |
| 4,414,291 A | 11/1983 | Breault |
| 4,463,066 A | 7/1984 | Adlhart et al. |
| 4,463,067 A | 7/1984 | Feigenbaum |
| 4,463,068 A | 7/1984 | Cohn et al. |
| 4,467,019 A | 8/1984 | Feigenbaum |
| 4,481,266 A | 11/1984 | Littauer et al. |
| 4,572,876 A | 2/1986 | Spurrier |
| 4,732,822 A | 3/1988 | Wright et al. |
| 4,735,872 A | 4/1988 | Maimoni |
| 4,820,598 A | 4/1989 | Descroix et al. |
| 4,842,963 A | 6/1989 | Ross, Jr. |

(Continued)

FOREIGN PATENT DOCUMENTS

WO  WO 00/36687  6/2000

OTHER PUBLICATIONS

U.S. Appl. No. 60/869,948.*

*Primary Examiner* — Ula C Ruddock
*Assistant Examiner* — Jacob Marks
(74) *Attorney, Agent, or Firm* — Francis T. Coppa

(57) ABSTRACT

A device or system for operating one or more electrochemical cells, such as a rechargeable fuel cell, is provided. A plurality of subsystems include a humidity level control subsystem, a reagent gas delivery subsystem, and a gas scrubbing subsystem. A method for operating the device or system is also provided.

12 Claims, 3 Drawing Sheets

U.S. PATENT DOCUMENTS

| | | |
|---|---|---|
| 4,963,444 A | 10/1990 | Delaney |
| 5,340,067 A | 8/1994 | Martin et al. |
| 5,356,729 A | 10/1994 | Pedicini |
| 5,560,999 A | 10/1996 | Pedicini et al. |
| 5,955,214 A | 9/1999 | Bellows et al. |
| 5,985,475 A | 11/1999 | Reynolds et al. |
| 6,248,464 B1 | 6/2001 | Pedicini et al. |
| 6,884,534 B2 | 4/2005 | Wheat et al. |
| 2005/0074644 A1* | 4/2005 | Ueda et al. ............... 429/22 |
| 2005/0152818 A1* | 7/2005 | Botvinnik et al. ....... 422/186.04 |
| 2006/0113131 A1* | 6/2006 | Kato et al. ............... 180/65.3 |
| 2008/0145721 A1* | 6/2008 | Shapiro et al. ............ 429/13 |

\* cited by examiner

US 8,343,687 B2

RECHARGEABLE FUEL CELL SYSTEM

BACKGROUND

1. Technical Field

Some embodiments may relate to a fuel cell or a secondary battery. Some embodiments may relate to methods associated with the fuel cell or the secondary battery.

2. Discussion of Related Art

Rechargeable fuel cells and/or batteries should have more than several thousand life cycles, and supply a sufficiently high output voltage. However, the performance of prior art cells are hindered by several factors. The performance may not be as good as would be desired.

Accordingly, it may be desirable to have a fuel cell or battery system with a design that differs from those designs that are currently available. Additionally, it may be desirable to have a method of using a fuel cell that differs from those methods that are currently available.

BRIEF DESCRIPTION

An embodiment according to the invention includes an apparatus. The apparatus may include a housing having an interior surface defining a volume, an air inlet, and an air outlet. An electrochemical cell can be disposed within the housing with an electrolyte solution. The electrochemical cell receives a reagent gas stream, and vents an exhaust gas stream. The apparatus may also include a humidity level control subsystem in vapor communication with the electrolyte solution. The humidity level control subsystem can maintain a humidity level near the equilibrium humidity level of the electrolyte solution. A gas scrubbing subsystem may be disposed within the housing and can be upstream from the electrochemical cell. The gas scrubbing subsystem may be in fluid communication with the reagent gas stream feeding the electrochemical cell. The apparatus may include a reagent gas delivery subsystem disposed within housing. The reagent gas delivery subsystem may be in fluid communication with, and upstream from, the gas scrubbing subsystem and may deliver the reagent gas stream to the gas scrubbing subsystem.

A method according to an embodiment of the invention includes controlling a humidity level in an air space adjacent to an electrolyte; reducing a carbon dioxide content of a reagent gas stream prior to the reagent gas stream contacting the air space in an electrochemical cell having an electrode capable of consuming a portion of the reagent gas stream; and controlling access from a reagent gas stream source so that during a use mode in which the electrode is consuming the reagent gas stream portion, the air space is in fluid communication with the reagent gas stream source; and during nonuse the air space is blocked from fluid communication with the reagent gas stream source.

Another embodiment includes an apparatus. The apparatus includes a means for generating a reagent gas stream. The apparatus may also include a means for electrochemically consuming at least a portion of the reagent gas stream and producing a corresponding quantity of electric power. The apparatus may further include a means for scrubbing carbon dioxide from the reagent gas stream. Additionally, the apparatus may include a means for controlling humidity level in an air space contacting the electrochemical cell.

BRIEF DESCRIPTION OF THE DRAWING FIGURES

DETAILED DESCRIPTION

Figure 1:
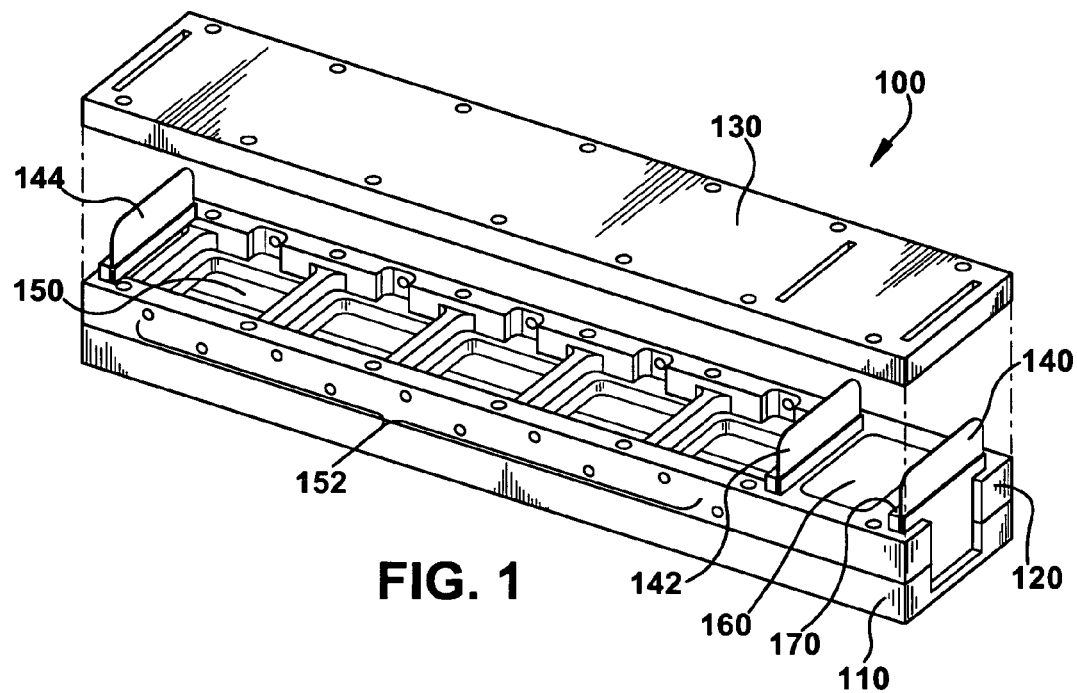
FIG. 1 is a perspective view drawing of an embodiment comprising a fuel cell assembly having a gas scrubbing subsystem and a humidity level control sub-system.

Some embodiments may include a fuel cell or a secondary battery. Some embodiments may relate to a method associated with the fuel cell or secondary battery.

Approximating language, as used herein throughout the specification and claims, may be applied to modify any quantitative representation that could permissibly vary without resulting in a change in the basic function to which it is related. Accordingly, a value modified by a term such as "about" may not to be limited to the precise value specified, and may include values that differ from the specified value. In at least some instances, the approximating language may correspond to the precision of an instrument for measuring the value. Similarly, "free" may be used in combination with a term, and may include an insubstantial number, or trace amounts, while still being considered free of the modified term.

As used herein the term humidity buffer solution includes any composition of matter that is capable of absorbing excess water from or adding replacement water to a selected electrolyte solution. This capability may include producing and maintaining an equilibrium humidity level at or near that of the selected electrolyte solution. Some humidity buffer solutions may include aqueous solutions of one or more organic or inorganic salts. Furthermore, the solvent is not limited to water alone. Water may be combined with any of a wide variety of soluble or semi-soluble additives.

As used herein, the term membrane may refer to a selective barrier that permits passage of protons and/or hydroxide ions generated at a cathode through the membrane to the anode for oxidation of hydrogen atoms at the anode to form water and heat. The terms cathode and cathodic electrode refer to a metal electrode that may include a catalyst. At the cathode, or cathodic electrode, oxygen from air is reduced by free electrons from the usable electric current, generated at the anode, that combine with water, generated by the anode, to form hydroxide ions and heat.

Some embodiments may include a plurality of cells, such as fuel cells or batteries. The plurality of cells may be in a parallel electrical circuit arrangement, a serial electrical circuit arrangement, or a portion may be arranged in parallel, and a portion may be arranged in series. In some embodiments at least a portion of the plurality of cells may be arranged in connection with a carbon dioxide scrubbing subsystem. Additionally, in some embodiments at least a portion of the plurality of cells may be arranged in connection with a corona current air delivery sub-system, which may be further operable to remove at least a portion of particulate contaminants disposed within an air gas stream. Furthermore, in some embodiments at least a portion of the plurality of cells may be arranged in connection with a humidity level-control subsystem. According to some embodiments, any given cell or group of cells may be arranged in connection with any one sub-system or any combination of sub-systems. Furthermore, any one of the foregoing subsystems may be arranged in connection with any one cell, any grouping of cells, or all of the cells.

Some embodiments may include a housing. The housing may contain and/or support portions of the apparatus. In some embodiments all, or a portion, of the housing may be made from electrically non-conductive materials. Some electrically non-conductive materials within the scope of the invention include, without limitation, polypropylene, polyethylene, polycarbonate, nylon, polyphenols, polymethylmethacrylate, polymethacrylate, polyethyleneterephthalate, fiberglass, fiberglass composite, and any combination thereof.

One embodiment may include a tray for holding a humidity buffer solution, such as 6M KOH. The tray may be disposed within a housing with a fuel cell electrolyte solution and spaced apart from the fuel cell electrolyte solution. The space between the fuel cell electrolyte solution and the humidity buffer solution may be occupied by a gas phase. According to this embodiment, the gas phase is in contact with both the fuel cell electrolyte solution and the humidity buffer solution. Therefore, water may pass from the humidity buffer solution to the fuel cell electrolyte solution, or from the fuel cell electrolyte solution to the humidity buffer solution. Accordingly, as the fuel cell electrolyte solution loses water, the losses can be compensated by drawing replacement water from the surrounding gas phase. Furthermore, the surrounding gas phase may maintain an approximately constant relative humidity level because it may draw replacement water from the humidity buffer solution.

Conversely, if the fuel cell collects, absorbs, or creates excess water, the excess can be expelled from the electrolyte solution by vaporizing it into the surrounding gas phase. Furthermore, the surrounding gas phase may maintain an approximately constant relative humidity level because it may release water to the humidity level.

Some materials can provide a stable humidity level that can be suitable for rechargeable fuel cells. Examples include, without limitation, saturated solutions of organic or inorganic salts, drying agent solutions, polymer gels and/or inorganic colloids. Table 1 sets forth a plurality of humidity buffer solutions that collectively can provide a wide range of equilibrium humidities. Some humidity buffer solutions can include one or more of $CaSO_4$, LiCl, $CH_3COOK$, $MgCl_2$, $KCO_3$, $Mg(NO_3)_2$, NaBr, $CoCl_2$, $NaNO_2$, $SrCl_2$, $NaNO_3$, NaCl, KBr, $(NH_4)_2SO_4$, KCl, $Sr(NO_3)_2$, $BaCl_2$, $KNO_3$, or $K_2SO_4$. In one embodiment the humidity buffer solution may be a saturated solution of one or more of $CaSO_4$, LiCl, $CH_3COOK$, $MgCl_2$, $KCO_3$, $Mg(NO_3)_2$, NaBr, $CoCl_2$, $NaNO_2$, $SrCl_2$, $NaNO_3$, NaCl, KBr, $(NH_4)_2SO_4$, KCl, $Sr(NO_3)_2$, $BaCl_2$, $KNO_3$, or $K_2SO_4$.

According to some embodiments, these humidity buffer solutions and other compositions may produce equilibrium humidities that are in a range of from about 50 percent to about 65 percent, or from about 65 percent to about 75 percent, or from about 75 percent to about 85 percent of the equilibrium humidity level of 6M KOH. According to some embodiments, such substances can generate a local environment having a humidity level that is stable and suitable for maintaining water balance in a rechargeable fuel cell.

TABLE 1

| Equilibrium humidity level of saturated salt solutions | | |
|---|---|---|
| SALT | 25° C. | 30° C. |
| $CaSO_4$ | <0.01 | <0.01 |
| LiCl | 0.112 | 0.115 |
| $CH_3COOK$ | 0.227 | 0.225 |
| $MgCl_2$ | 0.328 | 0.329 |
| $KCO_3$ | 0.432 | 0.447 |
| $Mg(NO_3)_2$ | 0.529 | 0.52 |
| NaBr | 0.576 | 0.574 |
| $CoCl_2$ | 0.649 | — |
| $NaNO_2$ | 0.643 | 0.649 |
| $SrCl_2$ | 0.709 | — |
| $NaNO_3$ | 0.743 | — |
| NaCl | 0.753 | 0.769 |
| KBr | 0.809 | — |
| $(NH_4)_2SO_4$ | 0.81 | — |
| KCl | 0.843 | 0.85 |
| $Sr(NO_3)_2$ | 0.851 | — |
| $BaCl_2$ | 0.902 | 0.92 |
| $KNO_3$ | 0.936 | — |
| $K_2SO_4$ | 0.973 | 0.977 |

An embodiment including a fuel cell device can be equipped with a tray or well for holding a humidity buffer solution. The tray can contain any of a variety of saturated salt solutions. According to this embodiment, the tray includes a part of a fuel cell stack. One side of the cell faces the surface of the humidity buffer solution. The humidity buffer solution provides a stable humidity level at or near the equilibrium humidity level of the electrolyte.

The humidity buffer solution may further include a hydrophilic additive. Suitable hydrophilic additives may include a polyacrylate, for example, sodium polyacrylate (PAA Na) CAS#: 9003-04-7. Additionally or alternatively, other suitable hydrophilic additives may include one or more alcohols, amines, ethers, or cellulosics. Suitable alcohols may be polyols, such as polyethylene glycol or. In one embodiment, the hydrophilic additive may include one or more of glycerin, carboxymethyl cellulose (CMC), or polyethylene oxide. In one embodiment, the hydrophilic additive may include one or more of polyacrylamide, polyvinyl alcohol or poly(vinyl acetate). The hydrophilic additives may include one or more functional groups that are effective for bonding with water. Suitable functional groups may include one or more of OH—, carboxyl, ether, and NH— functional groups. In one embodiment, more than one type of functional group is present on a single molecule.

The PAA Na, glycerin, polyethylene oxide, carboxymethyl cellulose (CMC), alcohols and amine additives may be soluble in water. The chemical formula for PAA Na is:

—$(CH_2—CH(COONa))_n$.

The chemical formula for carboxymethyl cellulose (CMC) is:

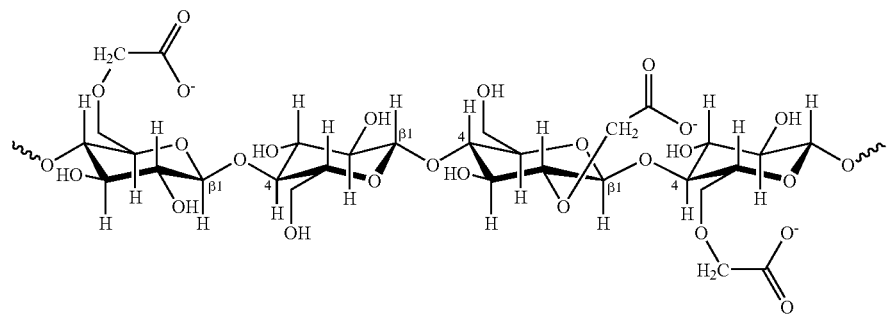

Suitable hydrophilic additives may have a molecular weight of less than about 3,000,000. Other suitable hydrophilic additives may have a molecular weight of greater than about 50,000. In one embodiment, the hydrophilic additive average molecular weight may be in a range of from about 50,000 to about 500,000; from about 500,000 to about 750,000; from about 750,000 to about 1,000,000; from about 1,000,000 to about 1,500,000; from about 1,500,000 to about 2,000,000; from about 2,000,000 to about 2,500,000; from about 2,500,000 to about 2,750,000; or from about 2,750,000 to about 3,000,000.

The hydrophilic additive may be present in the humidity buffer solution in a concentration effective for reducing water evaporation from the electrochemical cell. The hydrophilic additives may be present in the humidity buffer solution in an amount of up to about 95 weight percent based on the weight of the humidity buffer solution. In one embodiment, the hydrophilic additive may be present in the humidity buffer solution in an amount in a range of from about 0.5 weight percent to about 1.5 weight percent, from about 1.5 weight percent to about 2.5 weight percent, from about 2.5 weight percent to about 5 weight percent, from about 5 weight percent to about 7.5 weight percent, from about 7.5 weight percent to about 15 weight percent, from about 15 weight percent to about 25 weight percent, from about 25 weight percent to about 50 weight percent, from about 50 weight percent to about 65 weight percent, from about 65 weight percent to about 80 weight percent, or from about 80 weight percent to about 95 weight percent based on the weight of the humidity buffer solution.

During use, the hydrophilic additives may absorb water vapor from air and may retain the water in the humidity buffer solution. The presence of the hydrophilic additives in the humidity buffer solution may reduce the equilibrium vapor pressure of the humidity buffer solution. A relatively lower equilibrium vapor pressure may retain relatively more water in the humidity buffer solution as liquid.

In one embodiment, the humidity buffer solution is a KOH/PAA Na/water solution or gel. The solution of KOH/PAA Na/water may absorb water as water vapor from ambient air into the humidity buffer solution, and may retain that water within the electrochemical cell. This absorption of water from water vapor by PAA Na in the humidity buffer solution may results in a net water retention even under conditions where the relative humidity level of the vapor environment in the electrochemical cell is reduced because the equilibrium of the system favors retention of water in the humidity buffer solution.

The KOH/PAA Na/water humidity buffer solution may maintain water because when water evaporation increases, forming more water vapor, the KOH and PAA Na concentrations also increase within the humidity buffer solution. As a consequence, evaporation of water from the humidity buffer solution is decreased because the equilibrium vapor pressure for water favors retention of water in the humidity buffer solution. The water concentration increase in the humidity buffer solution continues until the vapor pressure favors water evaporation. This self-regulating water/water vapor dynamic may reduce or prevent a risk of the electrochemical cell drying out. This aspect may maintain a water balance in the cell within a determined range. For some embodiments, the PAA Na showed such effect up to about 800 times its weight in water.

While a KOH/PAA Na/water humidity buffer solution has been described, it is understood by one of ordinary skill in the art that other hygroscopic additives, such as alcohols, amines and glycerin are usable within an aqueous humidity buffer solution.

According to some embodiments, a fuel cell component may derive hydrogen from a solid-state material and water or from another hydrogen source. A porous metal hydride anode of the fuel cell may be operable for conducting electrons freed from the solid-state hydrogen storage material so that they can be supplied to current collectors. The porous metal hydride anode may include pores, and interstitial spaces that are operable for storing water and electrolyte. The porous metal hydride anode may have an improved charge efficiency occurring as a result of reducing electrolyte transfer. Porosity may create a volume within the anode for storage of water and/or electrolyte, which may be effective for off-setting water losses due to evaporation and consumption. For example, water may be retained in a porous metal hydride anode fabricated using sintered zinc powder.

A fuel cell cathode can conduct electrons back from an external circuit to a catalyst, where they combine with water and oxygen to form hydroxide ions. The catalyst may be operable for facilitating the reaction between hydrogen and oxygen. The catalyst may include materials including, but not limited to, platinum, palladium and ruthenium, which surface the separator membrane. The surface of the platinum may be such that a maximum amount of the surface area may be exposed to oxygen. Oxygen molecules can dissociate into oxygen atoms in the presence of the catalyst and accept electrons from the external circuit while reacting with hydrogen atoms, thus forming water. In this electrochemical reaction, a potential develops between the two electrodes.

A hydrogen-generating component of a hybrid system provides energy storage capacity and shares the porous anodic electrode of the fuel cell component. The hydrogen-generating component further may include an electrode and a separator membrane. The structure of the hydrogen-generating component may be a construction including one or more identical cells, with each cell including at least one each of an electrode, anodic electrode, and separator membrane. The anodic porous electrode may include a hydrogen storage material and may perform one or more functions, such as: (1) a solid-state hydrogen source for the fuel cell component; (2) an active electrode for the hydrogen-generating component; and (3) a portion or all of the electrode functions as an anode of the anode component.

The electrochemical hydrogen-generating component has storage characteristics characterized by being capable of accepting direct-current (DC) electrical energy in a charging phase to return the solid-state material to a hydrogen-rich form, retaining the energy in the form of chemical energy in the charge retention phase, and releasing stored energy upon a demand by the fuel cell component in a discharge phase. The hydrogen-generating component may repeatedly perform these three phases over a reasonable life cycle based on its rechargeable properties. The electrical energy may be supplied from an external source, a regenerative braking system, as well as any other source capable of supplying electrical energy. The solid state material may be recharged with hydrogen by applying the external voltage.

Suitable metal hydrides may include one or more of $AB_5$ alloy, $AB_2$ alloy, AB alloy, $A_2B$ alloy, $A_2B_{17}$ alloy, or $AB_3$ alloy. The $AB_5$ alloy may include, but is not limited to, $LaNi_5$, $CaNi_5$, or $MA_xB_yC_z$, wherein M may be a rare earth element component; A is one of the elements Ni or Co; B may be one of the elements Cu, Fe or Mn; (it is noted that as used herein "C" does not stand for elemental carbon) C may be one of the elements Al, Cr, Si, Ti, V or Sn. And, x, y and z satisfy one or more of the following relations, wherein $2.2 \leq x \leq 4.8$, $0.01 \leq y \leq 2.0$, $0.01 \leq z \leq 0.6$, or $4.8 \leq x+y+z \leq 5.4$. Suitable examples of $AB_2$ type alloys include, but are not limited to, Zr—V—Ni, Zr—Mn—Ni, Zr—Cr—Ni, TiMn, and TiCr. Suitable AB type alloys include, but are not limited to, TiFe and TiNi. Suitable $A_2B$ type alloys include, but are not limited to, $Mg_2Ni$. Suitable $A_2B_{17}$ type alloys include, but are not limited to, $La_2Mg_{17}$. Suitable $AB_3$ type alloys include, but are not limited to, $LaNi_3$, $CaNi_3$, and $LaMg_2Ni_9$.

In one embodiment, the anode material may include catalyzed complex hydrides. Suitable complex hydrides may include one or more of borides, carbides, nitrides, aluminides, or silicides. Suitable examples of complex catalyzed hydrides may include an alanate. Suitable alanates may include one or more of $NaAlH_4$, $Zn(AlH_4)_2$, $LiAlH_4$ and $Ga(AlH_4)_3$. Suitable borohydrides may include one or more of $Mg(BH_4)_2$, $Mn(BH_4)_2$ or $Zn(BH_4)_2$. In one embodiment, the anode material may include complex carbon-based structures or boron-based structures. Such complex carbon-based structures may include fullerenes, nanotubes, and the like. Such complex boron-based structures may include boron nitride (BN) nanotubes, and the like.

The metal hydride powder may be mixed with a conductive additive. Suitable conductive additives may include nickel or cobalt.

Sacrificial additives may be selected to control the pore volume and/or the pore configuration. For example, a weight of sacrificial additives may be selected to control pore volume. That is, the more of the sacrificial additive used, the more pore volume is generated when the sacrificial additive is removed. As another example, a type of sacrificial additive may be selected to control pore configuration. That is, the configuration of the sacrificial additive selected may control the pore configuration when the sacrificial additive is removed. The configuration may include such attributes as interconnectivity, diameter, length, spacing, and the like.

A determined amount of sacrificial additives may be added to form a mixture. The amount may be determined with reference to the desired pore volume of the end product. That is, an amount of the sacrificial additives having a known volume may be used to produce a corresponding desired volume in the end product. Suitable sacrificial additives may include one or more of zinc, aluminum, nickel, or carbon. In one embodiment, the sacrificial additives may include one or more of zinc acetate, aluminum acetate, or nickel acetate. In one embodiment, the sacrificial additives may include a carbonate, such as $NH_4HCO_3$.

The mixture may be pasted, formed, and/or pressed to form an anode electrode precursor structure. The anode electrode precursor structure may be heated. The heating may calcine and/or sinter the precursor structure to form an electrode main body. The sacrificial additives may be partially or entirely removed during, or after, the sintering and/or calcining process. If removed during, the heat of calcining and/or sintering may vaporize the sacrificial additives. If removed after, the sacrificial additives may be solvated or the like. Excipient salts may be useful for solvated removal after heating. The removal of the sacrificial additives may leave a porous metal anode electrode main body having a determined pore volume.

In one embodiment, the sacrificial additive may be selected to have an effect on the inner surface of the pores formed by the removal of the sacrificial additive. In such an instance, the composition of the sacrificial additive may be entirely or partially devoted to affecting the surface character of the pore. For example, if a metal particle is added to the sacrificial additive, which is otherwise a volatile low polymer, heating to vaporize the sacrificial additive may release the metal particle from the matrix of the sacrificial additive and the metal particle may deposit on the pore inner surface. Thus, the pore inner surface composition and character may be controlled. In one embodiment, a material is deposited on the pore inner surface that readily forms surface hydroxyl groups. The surface hydroxyls may increase the hydrophilicity of the pores and facilitate transport of polar liquids therethrough. In one embodiment, a selected catalyst may be deposited on the pore inner surface. It may be desirable to coat the outer surface of the sacrificial additive, which will contact and define the inner surface of the pore, with the material to be deposited.

During use, the pores may receive and store water and/or electrolyte. Suitable electrolytes may include aqueous KOH. The anode electrode main body may have a pore volume capable of storing quantities of water and electrolyte suitable for use in a rechargeable fuel cell or a metal hydride based battery. The pore volume may be greater that about 5 percent of the volume of the anode electrode main body. In one embodiment, the pore volume may be in a range of from about 5 percent to about 10 percent, from about 10 percent to about 15 percent, from about 15 percent to about 20 percent, from about 20 percent to about 25 percent, from about 25 percent to about 35 percent, from about 35 percent to about 45 percent, from about 45 percent to about 55 percent, or from about 55 percent to about 75 percent of the volume of the anode electrode main body.

Embodiments of the porous metal hydride anode may have a relatively improved charge efficiency resulting from a reduced electrolyte transfer. Electrolyte transfer may refer to the tendency of the electrolyte to migrate from the positive end proximate the cathode to the negative end proximate the anode during use. In a stack, particularly, the end cells may lose performance relative to the centrally located cells due to such migration, which may cause a concentration imbalance. By providing a physical obstacle to flow, in the form of a tortuous path and constricted pathways, electrolyte migration may be controlled, and thereby electrolyte transfer may be reduced.

Thus, some porous metal hydride electrode embodiments can store additional KOH electrolyte and can serve as anodes after being positioned with a membrane separator, air cathode electrode and other components and assembled into a rechargeable fuel cell. The additional quantity of KOH electrolyte stored in porous anode embodiments can reduce the water management concerns caused by the consumption and evaporation of water during the charge and discharge processes. At the same time, the use of porous anode embodiments in a rechargeable fuel cell improves the energy conversion and energy transfer efficiency of the fuel cell. The porous anode is also usable in fuel cells that are not rechargeable.

In one aspect, an embodiment may include a method for making a porous anode for use in a rechargeable fuel cell. The method may include, preparing a mixture. The mixture may include metal hydride and one or more sacrificial additives. For some embodiments, a gel binder may be added as part of the sacrificial additive. The additives may be sacrificial insofar as they may be subsequently removed during sintering and/or calcining, completely or in part, to form the pores of the porous anode.

The metal hydride and sacrificial additive mixture may be formed into a porous electrode main body, or green body. The green body may be sintered. Sintering may obtain a stable and strong connection among the metal hydride particles. Hydrogen gas may be introduced during sintering to reduce or prevent metal hydride oxidation. The sacrificial additive may be introduced during mixing, and may be removed during sintering and/or calcining. Alternatively, the sacrificial additive may be removed by other removal steps without sintering.

The metal hydride and sacrificial additive mixture may be paste sintered. In this paste sintered embodiment, a mixture of metal hydride and sacrificial additive may coat a metal foam plate, and may be paste sintered at a relatively high temperature.

In one embodiment for paste sintering, a nickel metal hydride may be mixed with a zinc sacrificial additive, forming a metal hydride mixture. The metal hydride mixture may be applied to a nickel foam. The wet coated nickel foam plate may be dried to form an electrode main body. The main body may be sintered at about 800 degrees Celsius. In one embodiment, the metal hydride mixture may be mixed further with a binder. Suitable binders may include styrene butadiene rubber and nickel. The mixed composition may be cold pressed onto the nickel foam plate to form a cold pressed assembly. The cold press assembly may be cold press sintered at a lower temperature than the temperature used for paste sintering.

The temperature range for paste sintering may be from about 100 degrees Celsius to about 800 degrees Celsius. The temperature range for cold press sintering may be in a range of from about 100 to about 300 degrees Celsius. Binders such as gel binders, styrene butadiene rubber, and carboxymethyl cellulose may be added to the cold press assembly and may be sintered at a temperature in a range of from about 500 degrees Celsius to about 800 degrees Celsius. Sacrificial additives may be added to the mixture before it is formed green structure, which may be further processed to become the electrode main body.

The sintered anodes may be treated to remove sacrificial additives. The treatment may include sonication, acidification, salvation, or dissolution by heat decomposition. Additive removal schemes for removing additives in an alkaline environment with sonication include treating with zinc or aluminum as follows:

$$Zn + 2OH^- \rightarrow ZnO_2^- + H_2$$

$$Al + 2OH^- \rightarrow AlO_2^- + H_2$$

The treatment with an alkaline material forms Zn and Al ionic species, which may be washed away.

Additive removal schemes for removing additives in an acidic environment with sonication may include treating with zinc or aluminum or ammonium carbonate as follows:

$$Zn + 2H^+ \rightarrow Zn^{2+} + H_2$$

$$Al + 2H^+ \rightarrow Al^{3+} + H_2$$

When Zn and Al are exposed to an acidic environment, zinc ion and aluminum ion, respectively, may be formed with hydrogen gas.

In one method embodiment, a sacrificial additive of aluminum powder may be mixed into anodic metal hydride material to form a mixture. The mixture may be coated onto a nickel foam and pressed to form an anode having a thickness of, in one embodiment, about 3 mm. The anode may be soaked in an alkaline solution to remove the aluminum. The soaked anode may be sintered in a mixture of argon gas and hydrogen gas, for some embodiments. For other embodiments, the anode may not be sintered.

Another method embodiment may include mixing $NH_4HCO_3$ into anodic metal hydride material, coating the mixture onto nickel foam and pressing to form an anode. In one embodiment, the thickness of an anode may be about 3 mm. The pressed anode may be heated at a temperature of about 60 degrees Celsius to remove the $NH_4HCO_3$ with the removal scheme below.

$$NH_4HCO_3 \rightarrow NH_3 + CO_2 + H_2O$$

Another method may include mixing nickel acetate into anodic metal hydride material, coating the mixture onto a nickel foam plate to form an anode. The anode may be heated to about 500 degrees Celsius to remove acetate ions, and form a porous anode with the removal scheme below. In another embodiment, the anode may be pressed to form an anode having thickness of about 3 millimeters (mm). The pressed anode may be heated to about 500 degrees Celsius to remove acetate ions, for example with the removal scheme below.

$$Ni(CH_3COO)_2 + H_2 \rightarrow Ni + C + CO_2 + H_2O$$

The pore volume of the porous anode may be determined by selecting a quantity of sacrificial additive, such as aluminum and zinc that produce the pore volume. The mechanical strength of the porous anode may be determined by selecting the pressure and time of sintering. The sintering effect may be affected by controlling the temperature and the time of sintering. The sintering process may destroy or chemically alter the binders, such as polytetrafluoroethylene and carboxymethyl cellulose.

According to some embodiments hydrogen and/or oxygen may be required by a fuel cell component to produce electrical energy. A rechargeable fuel cell may be operated with solid-state materials capable of hydrogen storage, such as, but not limited to, conductive polymers, ceramics, metals, metal hydrides, organic hydrides, a binary or other types of binary/ternary composites, nanocomposites, carbon nanostructures, hydride slurries and any other advanced composite material having hydrogen storage capacity.

Recharging of a rechargeable fuel cell may produce water and/or oxygen, which may be recycled. The electrochemical system may require cooling and management of the exhaust water. The water produced by the fuel cell component may recharge the solid-state fuel. For some embodiments, the only liquid present in the rechargeable fuel cell may be water or water-based solutions. Water management in the non-woven separation membrane may be useful. Because the membrane may function better if hydrated, the fuel cell component may operate under conditions where the water by-product does not evaporate faster than it may be produced. The porous metal anode embodiments described herein may aid in the maintenance of membrane hydration.

The rechargeable fuel cell embodiment described herein applies to power generation in general, transportation applications, portable power sources, home and commercial power generation, large power generation and to any other application that would benefit from the use of such a system.

While a fuel cell/hydrogen generator hybrid design is shown, other rechargeable fuel cell embodiments may include the porous metal hydride anode. The rechargeable fuel cell described may be operable for converting electrical energy into chemical energy, and chemical energy into electrical energy.

A third electrode may include a material with a low oxygen evolution over-potential. The third electrode may include one or more ferro-based alloys. Suitable ferro-based alloys may include stainless steel. Other examples of suitable materials may include one or more of cadmium, palladium, lead, gold, or platinum. The material may be configured to increase surface area, such as by foaming. A suitable example would be a nickel-based foam. Foams may enhance an ability of storing electrolyte solution within the volume of its pores, may provide an increased surface area for reaction, and may provide for diffusion control.

Applying a voltage between the anode and the third electrode of the cell and reversing the electrochemical reaction may recharge an electrically rechargeable fuel cell or metal/air battery. During recharging, the cell may generate oxygen. Generated oxygen may be released to the atmosphere through the air permeable cathode if desired.

The mechanism of a rechargeable fuel cell or metal/air battery may be shown below.

In charging process:
negative electrode: $4M+4H_2O+4e \rightarrow 4MH+4OH^-$
third electrode: $4OH^- \rightarrow O2+2H_2O+4e$
total electrolysis reaction: $4M+2H_2O \rightarrow 4MH+O_2$ In discharging process:
negative electrode: $4MH+4OH^-+4e \rightarrow 4M+4H_2O$
positive electrode: $O_2+2H_2O+4e \rightarrow 4OH^-$
total cell reaction: $4MH+O_2 \rightarrow 4M+2H_2O$ The cathode may be used during the discharge cycle, but may be inefficient in recharging the cell. Further, the cathode may deteriorate quickly when used to recharge. Thus, in some embodiments a third electrode may be utilized as a separate oxygen generation electrode. According to some embodiments, a third electrode may be utilized to extend the cycle life over traditional structures by chemically and mechanically protecting the cathode from degradation during recharge. The charge process takes place between the anode and the third electrode. The discharge process takes place between the anode and the cathode. Therefore, the cathode can be free from damage during the oxygen evolution reaction.

Some embodiments may include a separator membrane. The membrane may be an electrically insulating material. According to some embodiments the membrane may have a high ion conductivity. According to other embodiments, the membrane may be stable in alkaline environments. Non-limiting examples of suitable membrane materials include non-woven polyethylene (PE), polypropylene (PP), composites of PE and PP, asbestos or nylon.

According to some embodiments the separator membrane components may be superhydrophobic membranes. "Super-hydrophobicity," "super-lipophobicity," "super-amphiphobicity," and "super-liquid phobicity" all refer to properties of substances that cause a liquid drop on their surface to have a contact angle of 150 degrees or greater. Depending upon context, the liquid drop can include, e.g., a water or water-based drop (super-hydrophobicity), a lipid-based drop (super-lipophobicity), a water-based or lipid-based drop (super-amphiphobicity), or other liquids. Super-liquid phobicity includes a generic term indicating a substance that causes a fluid drop (e.g., lipid-based, aqueous-based, or other) to have a greater than 150 degrees contact angle.

According to some embodiments, it may be useful to supply oxygen or carbon dioxide-free air to an electrochemical cell. In one embodiment a gas supply sub-system may include one or more gas flow paths that cause gases disposed therein to contact one or more electrodes. According to some embodiments, it may be desirable to increase the volume energy density of the embodiment by fashioning gas flow paths that are somewhat small or thin. For example, appropriate thicknesses may be from about 0.1 millimeter to about 0.5 millimeter, or from about 0.5 millimeter to about 1 millimeter, or from about 1 millimeter to about 1.5 millimeters, or from about 1.5 millimeters to about 2 millimeters, or from about 2 millimeters to about 2.5 millimeters, or from about 2.5 millimeters to about 3 millimeters, or from about 3 millimeters to about 3.5 millimeters, or from about 3.5 millimeters to about 4 millimeters, or from about 4 millimeters to about 4.5 millimeters, or from about 4.5 millimeters to about 5 millimeters, or from about 5 millimeters to about 5.5 millimeters, or from about 5.5 millimeters to about 6 millimeters, or from about 6 millimeters to about 6.5 millimeters, or from about 6.5 millimeters to about 7 millimeters, or from about 7 millimeters to about 7.5 millimeters, or from about 7.5 millimeters to about 8 millimeters, or from about 8 millimeters to about 8.5 millimeters, or from about 8.5 millimeters to about 9 millimeters, or from about 9 millimeters to about 9.5 millimeters, or from about 9.5 millimeters to about 10 millimeters.

In some embodiments the gas flow path may be approximately the size of an electrode to which it delivers gas. In other embodiments the flow path may be smaller than the electrode to which it delivers gas. When the flow path is smaller than the electrode, it may form one or more channels, and such channels may form any of a variety of patterns including, without limitation, a snaking pattern.

According to some embodiments, the power of a fan or corona current gas moving device may determine the appropriate size, thickness or diameter of the gas flow path. Gas moving devices may be powered by the cell assembly, or one or more of the elements of the assembly. Alternatively, a gas moving device may be powered by an external power supply.

According the apparatus 100 shown in FIG. 1, when the gas has a linear velocity of about 0.2 m/s and the channel height is about 3 millimeters the apparatus may discharge at about 30 mA/cm². Embodiments having more than one layer of cells may be arranged so that a gas flow path is formed between two layers so that both layers contact a single gas flow. According to such embodiments, this arrangement may increase volume energy density by decreasing the number of required gas flow paths.

An apparatus 100 including an embodiment of the invention is shown in FIG. 1. The apparatus is a fuel cell system that includes a humidity level control component 110, a frame structure 120, a cover plate 130, a series of shutters (140, 142, 144), a fuel cell stack 152, a housing (not indicated with a reference number), a scrubber component 160, and a fan 170.

The scrubber component is in the housing upstream from the fuel cell stack, and down stream from the fan. The housing has a first shutter 140, a second shutter 142, and a third shutter 144, each of which can be operated independently. The cell stack is housed in a compartment defined by the second shutter 142, the third shutter 144, and walls of the housing.

Scrubbed air can be provided to the cell stack by opening the first shutter 140, the second shutter 142, and the third shutter 144, in conjunction with turning on the fan. Air is urged into contact with scrubbing material in the scrubber component to reduce or remove carbon dioxide from the air. From there the carbon dioxide free air stream enters the cell stack compartment.

The humidity level control component contains a humidity buffer solution and control the humidity level of the gas surrounding the electrochemical cells. The humidity level control component forms a base, and supports the frame structure. The frame structure supports components contained therein, including the electrochemical cell stack. The frame structure also supports the cover plate.

Figure 2:
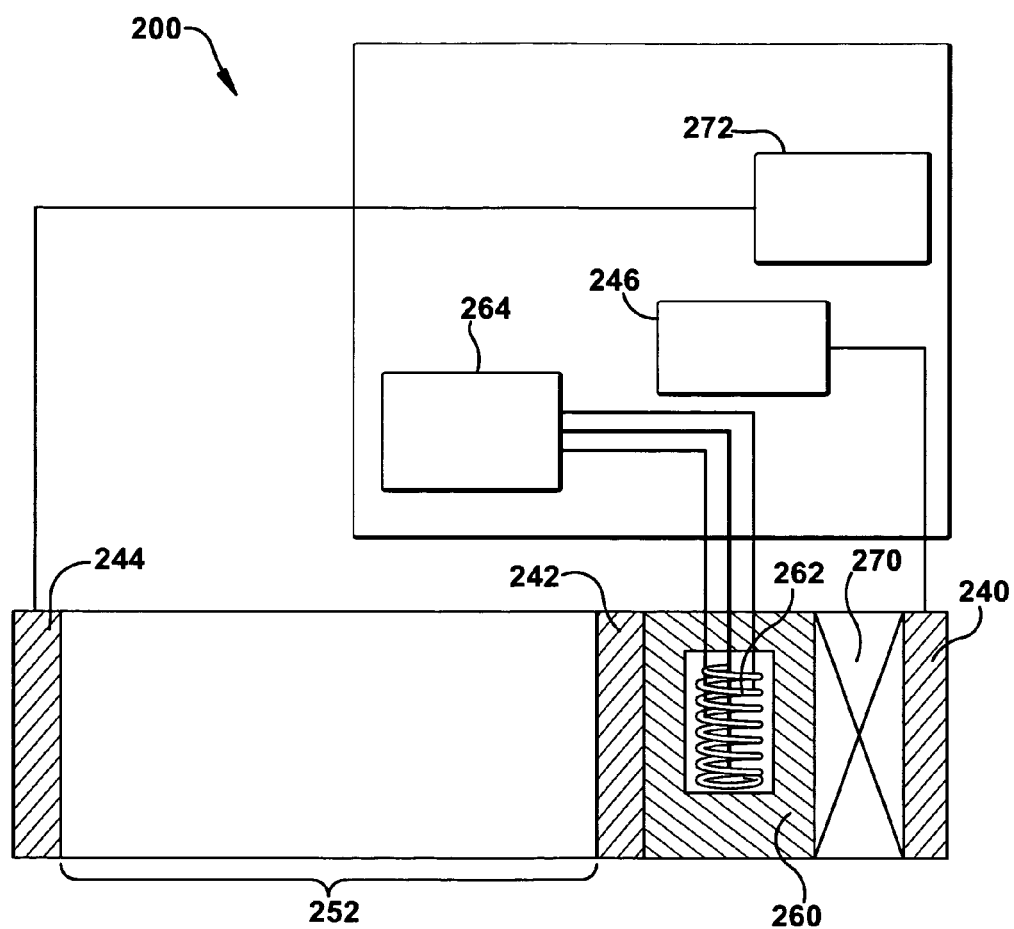
FIG. 2 is a schematic drawing of an embodiment comprising a control unit for controlling various sub-systems.

According to a variation of the embodiment shown in FIG. 1, an apparatus 200 can include several additional elements as shown in FIG. 2. Some embodiments may include one or more electrochemical cells 252. Some embodiments may also include a heating module 264 and heating element 262, for heating scrubbing material 260. Heating may enable the sub-system 200 to purge itself of adsorbed carbon dioxide, and regenerate the scrubbing material 260. The heating module 264 would be turned on, raising the temperature of the scrubbing material 260 and resulting in carbon dioxide desorption. The fan 270 would be reversed by the fan control module 272 so that it blows air out of the sub-system through the first shutter 240, which is open. According to this example, the second shutter 242 and third shutter 244 are both closed during regeneration. The shutter control module 246, fan control module 272, and heating module 264 may all be operably linked to, or form a component of, one or more computers. One or more of the shutter control module 246, fan control module 272, and heating module 264 may be powered by energy produced by the cell assembly.

In another embodiment, the regeneration process can occur during a charging cycle. According to this embodiment, the third shutter is closed, while the second shutter and the first shutter are both open. The heating element may be on, and the fan may be either reversed so that it blows out of the housing or it may be off. During the charging cycle, oxygen is produced by the cells and passes over the scrubbing material as it is vented from the housing at shutter. In some embodiments, passing the generated oxygen over the scrubbing material may facilitate and/or assist carbon dioxide desorption.

In some embodiments, the system may be capable of entering a rest phase or rest period, wherein the cells contained therein are not operating. In such embodiments all three shutters may be capable of being closed at the same time, rendering the system protected from carbon dioxide poisoning. All the shutters are in a closed configuration. In this condition, the system may be operably impermeable to gases.

Suitable shutters can opening and close in response to an electrical signal from a controller. The shutter may be controlled by a computer or integrated circuit. The shutter may be actuated in response to one or more of a piezoelectric signal, a timing device, gas flow, or in response to an appropriate sensor component according to an embodiment of the invention. The shutters can protect the internal components, such as susceptible electrodes, from carbon dioxide levels that may impair performance. The shutter may be mechanically actuated, and another shutter may be electrically actuated.

Figure 3:
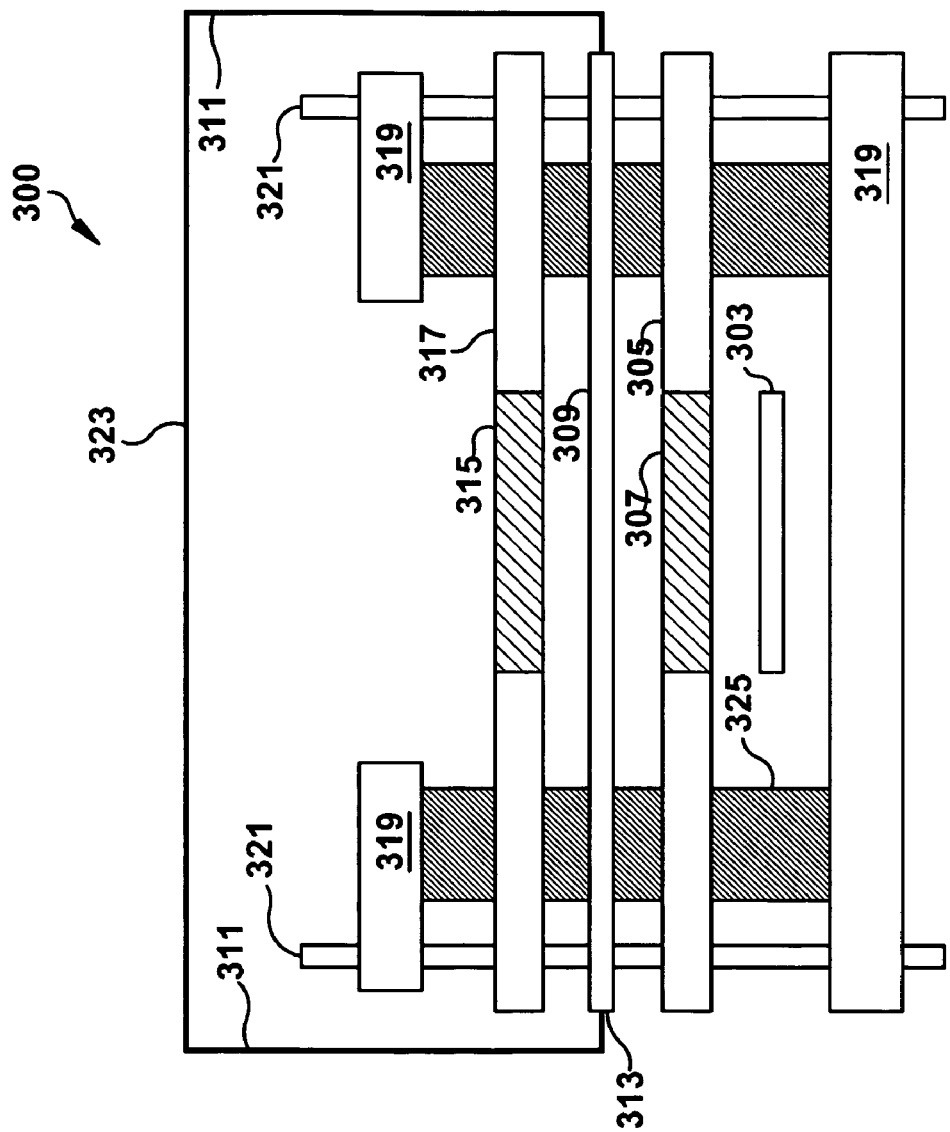
FIG. 3 is a drawing of an embodiment comprising a fuel cell and a gas scrubbing sub-system.

With reference to FIG. 3, a gas scrubber 300 can be combined with a galvanic electrochemical cell 303. The cell may be a rechargeable fuel cell unit, alkaline fuel cell or metal/air battery, for example. A first shutter 315 is supported by a first shutter support layer 317 and is adjacent to ambient air. The first shutter controls access and flow of air or oxygen into and out of the device. A scrubbing material layer 309 in the gas scrubber may be positioned below or underneath the first shutter support layer. The scrubbing material layer couples to a resistance coil 311 that can be thermally or electrically activated to reverse the binding of the target gas. The resistance coil may also be fitted with a temperature control 313.

A second shutter support layer 305 may include a second shutter 307, which controls the access and flow of the filtered air or oxygen to a galvanic cell unit 303. Pure oxygen generated during the charging process can help to release the bound target gas from the scrubbing material. Gaskets 325 and through-bolts 321 support the components of the device within a housing 319. The positioning and control of the shutters, and the choice or selection of scrubbing materials, may allow for management of potentially disrupting target gases.

Target gases may include one or more of carbon dioxide, sulfur oxides, or nitrogen oxides. Air or oxygen may be scrubbed of the target gas prior to contact with the electrolyte, and/or the electrodes, of the galvanic cell unit 303. The thermal or electric control of the resistance coil 311 may allow regeneration of the scrubbing materials of the scrubbing material layer 309. Such control may reduce or eliminate periodic maintenance, such as the replacement and/or replenishment of scrubbing materials. The scrubbing material layer 309 may include one or more scrubbing materials that are capable of chemically and/or physically binding a target gas.

Heating elements may be formed as wires, films, meshes, and foams. Furthermore, such elements can include any electrically conductive metal or alloy that is sufficiently resistive to form a suitable heating element. Suitable metals may include refractory metals such as tungsten, tantalum, molybdenum, niobium, rhenium, and zirconium. Also suitable are alloys of the foregoing refractory metals.

Suitable heating temperature ranges for carbon dioxide desorption from a scrubbing material may be greater than 50 degrees Celsius. In one embodiment, the desorption temperature may be in a range of from about from about 30 degrees Celsius to about 40 degrees Celsius, from about 40 degrees Celsius to about 50 degrees Celsius, from about 50 degrees Celsius to about 60 degrees Celsius, from about 60 degrees Celsius to about 70 degrees Celsius, from about 70 degrees Celsius to about 80 degrees Celsius, from about 80 degrees Celsius to about 90 degrees Celsius, from about 90 degrees Celsius to about 100 degrees Celsius, from about 100 degrees Celsius to about 110 degrees Celsius, from about 110 degrees Celsius to about 120 degrees Celsius, from about 120 degrees Celsius to about 140 degrees Celsius, from about 140 degrees Celsius to about 160 degrees Celsius, from about 160 degrees Celsius to about 180 degrees Celsius, from about 180 degrees Celsius to about 200 degrees Celsius, and from about 200 degrees Celsius to about 240 degrees Celsius.

Suitable scrubbing materials may include one or more of amines, amidines, or amides. The scrubbing materials may be polymers or composites that include such nitrogen-based functionality and the like. Copolymers and blends of the active molecules or polymers can also be utilized in some embodiments. In one embodiment, the polymeric scrubbing material may include one or more of an amine, a amidine, or an amide functional group.

Suitable amines may include one or more alkyl ethanolamine. Suitable alkyl ethanolamine may include one or more of triethanolamine (TEA), monoethanolamine (MEA), diethanolamine (DEA), or methyl diethanolamine (MDEA). Other suitable amines may include propanolamines, or other longer chain alkanes having a hydroxyl functionality and an amine functionality. Both primary and secondary amines may be utilized. In one embodiment, the scrubbing material may include polyamine functionality. Suitable amines may be commercially obtained at Dow Chemical (Midland, Mich.). Unless specified otherwise, all ingredients are commercially available from such common chemical suppliers as Alpha Aesar, Inc. (Ward Hill, Mass.), Sigma-Aldrich Company (St. Louis, Mo.), and the like.

Suitable amidines may include one or more of 1,8-diazabicyclo(5.4.0)-undec-7-ene (DBU), tetrahydropyrimidine (THP), N-methyltetrahydropyrimidine (MTHP). Additionally, some amidines may be supported by a polymer such as polystyrene, polymethacrylate, polyacrylate. In one embodiment, the amidine may include one or more of a bis-amidine, tris-amidine, or tetra-amidine, or a salt of any of these.

In one embodiment, the active polymer may be produced through radical polymerization, cationic polymerization, anionic polymerization, group transfer polymerization, ring-opening polymerization, ring-open metathesis polymerization, coordination polymerization, condensation polymerization, etc. The active polymer may be also produced by modification of a pre-made polymer structure using suitable active molecules. In one embodiment, the amidine may include a composition having the general formula X—Y(Z)n. In this formula, X is a moiety of:

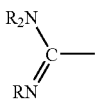

Formula I wherein each R is, independently, hydrogen or an optionally substituted alkyl, alkenyl, aryl, alkaryl, or alkenylaryl group, Y is a bond or a linking group, Z is hydrogen or a moiety according to Formula I, which may be the same or different than X, and n is an integer from 1 to 3.

Alkyl includes an aliphatic hydrocarbon group that may be linear or branched having from 1 to about 15 carbon atoms, in some embodiments 1 to about 10 carbon atoms. Branched includes that one or more lower alkyl groups such as methyl, ethyl, or propyl are attached to a linear alkyl chain. Lower alkyl includes having 1 to about 6 carbon atoms in the chain, which may be linear or branched. One or more halo atoms, cycloalkyl, or cycloalkenyl groups may be a substitute for the alkyl group.

Alkenyl includes an aliphatic hydrocarbon group containing a carbon-carbon double bond and which may be straight or branched having 2 to about 15 carbon atoms in the chain. Preferred alkenyl groups have 2 to about 10 carbon atoms in the chain, and more preferably 2 to about 6 carbon atoms in the chain. Lower alkenyl includes 2 to about 4 carbon atoms in the chain, which may be straight or branched. The alkenyl group may be substituted by one or more halo atoms, cycloalkyl, or cycloalkenyl groups. Cycloalkyl includes a non-aromatic mono- or multicyclic ring system of about 3 to about 12 carbon atoms. Exemplary cycloalkyl rings include cyclopentyl, cyclohexyl, and cycloheptyl. The cycloalkyl group may be substituted by one or more halo atoms, methylene, alkyl, cycloalkyl, heterocyclyl, aralkyl, heteroaralkyl, aryl or heteroaryl. Hetero includes oxygen, nitrogen, or sulfur in place of one or more carbon atoms. Cycloalkenyl includes a non-aromatic monocyclic or multicyclic ring system containing a carbon-carbon double bond and having about 3 to about 10 carbon atoms. The cycloalkenyl group may be substituted by one or more halo atoms, or methylene, alkyl, cycloalkyl, heterocyclyl, aralkyl, heteroaralkyl, aryl, or heteroaryl groups.

Aryl includes an aromatic carbocyclic radical containing about 6 to about 12 carbon atoms. Exemplary aryl groups include phenyl or naphthyl optionally substituted with one or more aryl group substituents which may be the same or different, where "aryl group substituent" includes hydrogen, alkyl, cycloalkyl, optionally substituted aryl, optionally substituted heteroaryl, aralkyl, aralkenyl, aralkynyl, heteroaralkyl, heteroaralkenyl, heteroaralkynyl, hydroxy, hydroxyalkyl, alkoxy, aryloxy, aralkoxy, carboxy, acyl, aroyl, halo, nitro, cyano, carboxy, alkoxycarbonyl, aryloxycarbonyl, aralkoxycarbonyl, acylamino, aroylamino, alkylsulfonyl, arylsulfonyl, and other known groups. Alkaryl includes an aryl-alkyl-group in which the aryl and alkyl are as previously described. Alkenylaryl includes an aryl-alkenyl-group in which the aryl and alkenyl are as previously described.

In the general formula X—Y(Z)n, Y can be a bond or a linking group R', which may be, or include, a hetero-atom such as oxygen, sulfur, phosphorous, or nitrogen, and the like. The linking group R' may be an alkyl, alkenyl, aryl, or alkaryl group having from 1 to about 15 carbon atoms, which may be linear or branched, and which may be non-fluorinated, fluorinated, or perfluorinated. n is greater than 1. In one embodiment, the amidine may include one or more carboxylate salts of an amidine, which amidine and/or salt optionally can be fluorinated or perfluorinated.

The carbon dioxide may react with the scrubbing materials to form such products as zwitterions adducts and ammonium carbamate, for example. Scrubbing materials may be selected based on the ability to physically bind a target gas, which if carbon dioxide may include carbon fiber compositions and their composites. For example, carbon fiber composite molecular sieve (CFCMS) can adsorb carbon dioxide. Other suitable materials for physical binding of a target gas may include carbon nanotubes, buckyballs or fullerenes, porous ceramics, zeolites, and the like.

Such scrubbing materials can adsorb carbon dioxide in low temperatures during the discharge process of the galvanic cell unit 303 by either a chemical reaction, physical adsorption or both. The scrubbing materials can be regenerated within the scrubbing material layer 311 by applying a thermal treatment in the range of greater than about 65 degrees Celsius to the resistance coil during the charge period of the galvanic cell unit 303. In one embodiment, the thermal treatment may be less than about 120 degrees Celsius. Further, the temperature range may be from about 65 degrees Celsius to about 80 degrees Celsius, from about 80 degrees Celsius to about 100 degrees Celsius, from about 100 degrees Celsius to about 110 degrees Celsius, or from about 110 degrees Celsius to about 120 degrees Celsius. Alternatively or additionally, applying a low voltage to the resistance coil may regenerate the scrubbing materials.

The embodiments described herein are examples of compositions, structures, systems and methods having elements corresponding to the elements of the invention recited in the claims. This written description enables one of ordinary skill in the art to make and use embodiments having alternative elements that likewise correspond to the elements of the invention recited in the claims. The scope thus includes compositions, structures, systems and methods that do not differ from the literal language of the claims, and further includes other compositions, structures, systems and methods with insubstantial differences from the literal language of the claims. While only certain features and embodiments have been illustrated and described herein, many modifications and changes may occur to one of ordinary skill in the relevant art. The appended claims are intended to cover all such modifications and changes.

What is claimed is:

1. A fuel cell system, comprising:
    at least one housing having an interior surface defining a volume, and an air inlet and an air outlet;
    a frame structure disposed within the housing;
    at least one electrolyte solution disposed within the housing;
    a humidity level control subsystem, comprising at least one humidity buffer solution, and disposed within the housing and in vapor communication with the at least one electrolyte solution, wherein the humidity level control subsystem is operable to maintain a humidity level at or near the equilibrium humidity level of the electrolyte solution;
    at least one electrochemical cell disposed within the frame structure, and including the electrolyte solution, wherein the electrochemical cell is operable to receive at least one reagent gas stream, and to vent at least one exhaust gas stream;

a gas scrubbing subsystem disposed within the frame structure, and which is upstream from the electrochemical cell, and is in fluid communication with the reagent gas stream feeding the electrochemical cell;

a gas moving device disposed within the frame structure, wherein the gas moving device is in fluid communication with the gas scrubbing subsystem, and is upstream from the gas scrubbing subsystem, and the gas moving device is operable to deliver the reagent gas stream to the gas scrubbing subsystem, and at least one shutter disposed within the frame structure, that is capable of controlling the access of the reagent gas stream into and out of the housing.

2. The fuel cell system as defined in claim 1, wherein the electrochemical cell is part of a rechargeable fuel cell or of a metal hydride secondary battery.

3. The fuel cell system as defined in claim 1, wherein the humidity buffer solution comprises a metal halide salt selected from the group consisting of KBr, NaBr, $BaCl_2$, $CoCl_2$, KCl, LiCl, $MgCl_2$, NaCl, and $SrCl_2$.

4. The fuel cell system as defined in claim 1, wherein the humidity buffer solution comprises a salt selected from the group consisting of $CaSO_4$, $K_2SO_4$, and $(NH_4)_2SO_4$.

5. The fuel cell system as defined in claim 1, wherein the humidity buffer solution comprises a salt selected from the group consisting of $Mg(NO_3)_2$, $NaNO_2$, $NaNO_3$, $Sr(NO_3)_2$, and $KNO_3$.

6. The fuel cell system as defined in claim 1, wherein the humidity buffer solution comprises a material selected from the group consisting of $CH_3COOK$ and $KCO_3$.

7. The fuel cell system as defined in claim 1, wherein the humidity buffer solution is a saturated solution or a slurry.

8. The fuel cell system as defined in claim 1, wherein the gas scrubbing subsystem is operable to remove at least a portion of carbon dioxide from a reagent gas stream.

9. The fuel cell system as defined in claim 1, wherein the gas scrubbing subsystem comprises a material selected from the group consisting of amine, amidine, and amide.

10. The fuel cell system as defined in claim 9, wherein the amine comprises a composition selected from the group consisting of tripropanol amine, dipropanol amine, monopropanol amine, triethanolamine, monoethanolamine, diethanolamine, and methyl diethanolamine.

11. The fuel cell system as defined in claim 9, wherein the amidine comprises a composition selected from the group consisting of 1,8-diazabicyclo (5.4.0) undec-7-ene, tetrahydro pyrimidine, and N-methyl tetrahydro pyrimidine.

12. The fuel cell system as defined in claim 1, wherein the gas moving device comprises a corona current gas moving device.

* * * * *